United States Patent
Tuyls et al.

(10) Patent No.: US 8,775,809 B2
(45) Date of Patent: Jul. 8, 2014

(54) FUZZY BIOMETRICS BASED SIGNATURES

(75) Inventors: Pim Theo Tuyls, Eindhoven (NL);
Gregory Krimhild Rene Neven, Lanaken (BE)

(73) Assignee: Koninklijke Philips N.V., Eindhoven (NL)

( * ) Notice: Subject to any disclaimer, the term of this patent is extended or adjusted under 35 U.S.C. 154(b) by 1024 days.

(21) Appl. No.: 12/515,020

(22) PCT Filed: Nov. 12, 2007

(86) PCT No.: PCT/IB2007/054582
§ 371 (c)(1),
(2), (4) Date: May 15, 2009

(87) PCT Pub. No.: WO2008/062340
PCT Pub. Date: May 29, 2008

(65) Prior Publication Data
US 2010/0058063 A1    Mar. 4, 2010

(30) Foreign Application Priority Data
Nov. 21, 2006   (EP) .................................... 06124463

(51) Int. Cl.
*G06F 21/00*   (2013.01)
(52) U.S. Cl.
USPC ............................. 713/172; 713/175; 713/186
(58) Field of Classification Search
USPC .......................................... 713/186, 172, 176
See application file for complete search history.

(56) References Cited

U.S. PATENT DOCUMENTS

| | | | |
|---|---|---|---|
| 6,886,096 B2 * | 4/2005 | Appenzeller et al. | 713/170 |
| 2004/0149827 A1 * | 8/2004 | Zuili | 235/439 |
| 2006/0016875 A1 * | 1/2006 | Bonalle et al. | 235/380 |

FOREIGN PATENT DOCUMENTS

| | | | |
|---|---|---|---|
| CN | 1274448 A | * | 11/2000 |
| WO | 9850875 A3 | | 11/1998 |
| WO | 2006070322 A1 | | 7/2006 |

OTHER PUBLICATIONS

Written Opinion of the International Searching Authority for International Application No. PCT/IB2007/054582.
Uludag et al: "Biometric Cryptosystems: Issues and Challenges"; Proceedings of the IEEE, vol. 92, No. 6, Jun. 2004, pp. 948-960.
Freire-Santos et al: "Cryptographic Key Generation Using Handwritten Signature:"; Biometric Technology for Human Identification III, Flynn, Pankanti(Eds), Proceedings of SPIE, vol. 6202, Apr. 2006, pp. 62020N1-62020N7.
Boult et al: "Revocable Fingerprint Biotokens: Accuracy and Security Analysis"; Computer Vision and Pattern Recognition (CVPR'07), IEEE Conference on Jun. 1, 2007,pp. 1-8.

(Continued)

*Primary Examiner* — Gilberto Barron, Jr.
*Assistant Examiner* — Malcolm Cribbs

(57) ABSTRACT

A method and a device of verifying the validity a digital signature based on biometric data. A verifier attains a first biometric template of the individual to be verified, for instance by having the individual provide her fingerprint via an appropriate sensor device. Then, the verifier receives a digital signature and a second biometric template. The verifier then verifies the digital signature by using either the first or the second biometric template as a public key. The attained (first) biometric template of the individual is compared with the received (second) biometric template associated with the signature and if a match occurs, the verifier can be confident that the digital signature and the associated (second) biometric template have not been manipulated by an attacker for impersonation purposes.

9 Claims, 1 Drawing Sheet

(56) References Cited

OTHER PUBLICATIONS

Davida et al: "On Enabling Secure Applications Through Off-Line Biometric Identification"; Security and Privacy, 1998, Proceedings 1998 IEEE Symposium, Oakland, CA, May 3-6, 1998, Computer Society, US, May 3, 1998, pp. 148-157.

Tuyls et al: "Practical Biometric Authentication With Template Protection"; Audio and Video Based Biometric Person Authentication (AVBPA 2005),Lecture Notes in Computer Science; LNCS vol. 3546, Jan. 1, 2005, pp. 436-446.

Uludag et al: "Securing Fingerprint Template:Fuzzy Vault With Helper Data"; Proceedings of the 2006 Conference on Computer Vision and Pattern Recognition Workshop (CVPRW '06) Jun. 17, 2006, 8 Page Article.

Adler, A.: "Vulnerabilities in Biometric Encryption Systems"; Audio and Video Based Biometric Person Authentication (AVBPA 2005), Lecture Notes in Computer Science, LNCS vol. 3546, Jan. 1, 2005, pp. 1100-1109.

Roberts, C.: "Biometric Attack Vectors and Defences"; Computers & Security, Elsevier Science Publishers, vol. 26, No. 1, Feb. 2007, pp. 14-25.

Burnett et al:"A Biometric Identity Based Signature Scheme"; Crypto Group, Computer Science Dept., Nui Maynooth, Co. Kildare, Ireland, 7 Page Document.

Sahai et al: "Fuzzy Identity-Based Encryption"; 15 Page Document.

M. Bellare et al, Security Proofs for Identity-Based Identification and Signature, Eurocrypt 2004, 21 Pages.

* cited by examiner

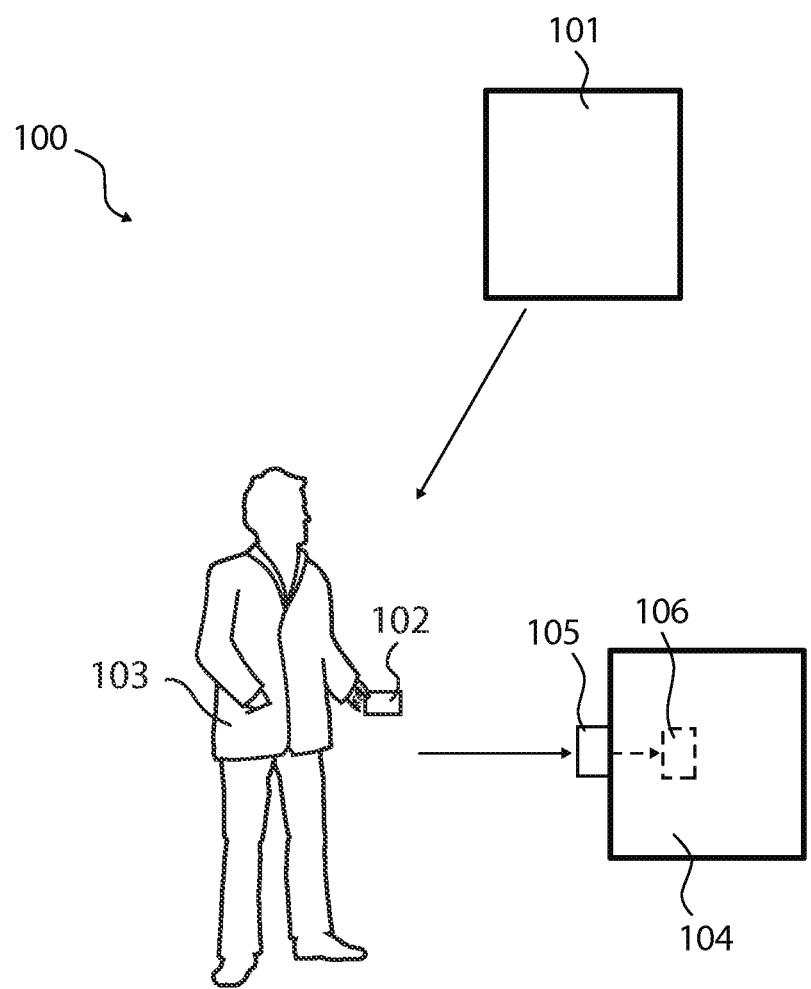

FUZZY BIOMETRICS BASED SIGNATURES

TECHNICAL FIELD OF THE PRESENT INVENTION

The present invention relates to a method and a device of verifying the validity of a digital signature based on biometric data.

BACKGROUND ART

The use of biometrics for identification and/or authentication of an individual is in many cases considered to be a better alternative to traditional identification means such as passwords and pin-codes. The number of systems that require identification in the form of passwords/pin-codes is steadily increasing and, consequently, so is the number of passwords/pin-codes that a user of the systems must memorize. In biometric identification, features that are unique to a user such as fingerprints, irises, ears, faces, etc. are used to provide identification of the user. Clearly, the user does not lose or forget his/her biometric features, neither is there any need to write them down or memorize them.

On the other hand, biometrics may also be used as public identifiers in public-key cryptography, including digital signatures. That is, it should be possible for an individual in such a scheme to provide a set of data, e.g. an electronic document, with a signature such that a third party subsequently can verify the validity of the signature based on the signer's biometric data. In traditional public-key signature schemes, a (randomly generated) public key is usually associated to the identity of a signer by means of a certificate, issued by a trusted certification authority. When trying to use biometric information as the signer's identity, a problem arises because traditional signature schemes verify correctly only under a single public key, rather than under a whole range of public keys that are sufficiently "close" to the one used to sign the message. Due to the very nature of biometrics and the measurement errors involved in acquiring a biometric template of an individual, two biometric templates of a given individual will never be completely identical, which makes identification problematic. Therefore, a matching algorithm should allow for small differences between the two templates.

Identity Based Signature (IBS) schemes are previously known and use identities as public keys, for example an arbitrary bit string in the form of an email address. Conventional signature schemes, on the other hand, typically use extensive bit strings as public keys and rely on digital certificates to associate an individual with a public key. "A biometric identity based signature scheme" by Burnett, Duffy and Dowling discloses a signature scheme where biometric data of an individual is used to create and verify a digital signature. However, in this disclosure, biometric data is extracted and processed by means of employing the concept of fuzzy extractors.

SUMMARY OF THE INVENTION

An object of the present invention is to solve above mentioned problems in the prior art relating to IBS based schemes.

In a first aspect of the invention, there is provided a method comprising the steps of attaining a first biometric template of an individual to be verified, receiving a digital signature and a second biometric template of an individual associated with the signature, verifying the digital signature by means of using any one of the two biometric templates as a public key and comparing the first biometric template with the second biometric template, wherein the verification of the digital signature is considered to be valid if the first template corresponds to the second template.

In a second aspect of the invention, there is provided a device comprising means for attaining a first biometric template of an individual to be verified, means for receiving a digital signature and a second biometric template of an individual associated with the signature, means for verifying the digital signature by means of using any one of the two biometric templates as a public key and means for comparing the first biometric template with the second biometric template, wherein the verification of the digital signature is considered to be valid if the first template corresponds to the second template.

A basic idea of the invention is that a verifier attains a first biometric template of the individual to be verified, for instance by having the individual provide her fingerprint via an appropriate sensor device. This may be performed under supervision of the verifier such that it can be assured that the first template is authentic. Then, the verifier receives a digital signature and a second biometric template. The verifier then verifies the digital signature by means of using either the first or the second biometric template as a public key. By verifying the signature, non-repudiation is provided. The attained (first) biometric template of the individual is compared with the received (second) biometric template associated with the signature and if a match occurs, the verifier can be confident that the digital signature and the associated (second) biometric template have not been manipulated by an attacker for impersonation purposes. Thus, integrity is provided by means of the comparison of the two biometric templates.

The present invention is advantageous, since the individual always "carries" her public key with her in the form of a biometric feature, such as a fingerprint, iris, ear, face, etc., from which a biometric template may be extracted and used for comparison with a biometric template associated with a digital signature. The public key can thus easily be distributed in an authentic manner. Further, the present invention provides non-repudiation by means of the digital signature. In addition, assuming that an attacker steals a digital signature and an associated biometric identifier and sends a new digital signature along with a corresponding new biometric template to the verifier, the verifier will be able to prevent a fraud, since the biometric template associated with the signature will be compared with a true biometric template of the individual.

Note that either the first or the second biometric template can be used for verifying the digital signature. Further, it is possible that the verifier first receives the digital signature and the "second" biometric template and then attains the "first" biometric template of the individual.

Further features of, and advantages with, the present invention will become apparent when studying the appended claims and the following description. Those skilled in the art realize that different features of the present invention can be combined to create embodiments other than those explicitly described in the following.

BRIEF DESCRIPTION OF THE DRAWINGS

A detailed description of preferred embodiments of the present invention will be given in the following with reference made to the accompanying drawing.

FIG. 1 shows a system implementing an identity based signature scheme, in which the present invention may be applied.

DETAILED DESCRIPTION OF EMBODIMENTS OF THE INVENTION

FIG. 1 illustrates a system 100 implementing an Identity Based Signature (IBS) scheme. Such a scheme generally utilizes four algorithms denoted ($MK_g$, $Uk_g$, Sign, Vf) for creating key pairs and performing cryptographic operations. A trusted key-issuing authority 101 runs a master key algorithm $MK_g$ to obtain a master key pair (mpk, msk) comprising a (master) public key and a (master) secret key. For schemes in which intercompany transactions are undertaken, the key-issuing authority is typically a trusted $3^{rd}$ party, whereas in the case the IBS scheme is implemented internally in a company, such as a bank, the trusted authority is typically the company itself. The trusted authority then runs a user-key generation algorithm $Uk_g$ on the secret master key msk and an identity I of an individual wishing to be enrolled in the system. In this way a secret key usk is generated for the individual associated with the identity I. The generated secret key usk of the individual and the individual's registered identity I can be distributed to the individual using a number of different approaches. One approach is to store the data on a smart card 102 and distribute it to the individual 103.

The individual then uses his smart card 102 comprising the secret key usk and a signing algorithm Sign to create a signature $\sigma(m)$ on a message m. This signature is sent along with the message and the individual's public key, i.e. the identity I, to a verifier 104. In order to verify the signature, the verifier uses the identity I and applies a verification algorithm Vf to verify the signature $\sigma(m)$. Typically, the smart card 102 creates a message m and signs the message with the private key usk of the individual to create the signature $\sigma(m)$. A data set comprising [$\sigma(m)$, I, m] is sent to the verifier. The verifier checks that the verification algorithm Vf accepts the signature $\sigma(m)$ for message m and identity I. If that is the case, the digital signature is considered valid. If not, the message m has either been changed after it was signed, or it was not signed with the private key usk of the individual.

An extensive overview of usable underlying IBS schemes is disclosed in "Security proofs for identity-based identification and signature schemes" by M. Bellare, C. Namprempre and G. Neven: "Security proofs for identity-based identification and signature schemes", Eurocrypt 2004.

In an IBS scheme based on biometrics, the trusted authority runs the user-key generation algorithm $Uk_g$ on the secret master key msk and a first biometric template $\omega$ of an individual wishing to be enrolled in the system. Hence, a secret key usk is generated for the individual associated with the first biometric template $\omega$. The biometric template is derived from a biometric feature of the individual, e.g. a fingerprint. Now, in an embodiment of the present invention, after having received his secret key usk from the trusted authority 101, the individual uses his smart card 102 comprising the secret key usk and the signing algorithm Sign to create a signature $\sigma(m)$ on a message m. This signature is sent along with the message and the individual's public key, i.e. first biometric template $\omega$, to the verifier 104. In order to verify the signature, the verifier 104 uses the first template $\omega$ and applies a verification algorithm Vf to verify the signature $\sigma(m)$. Typically, the smart card 102 creates a message m and signs the message m with the private key usk of the individual to create the signature $\sigma(m)$. A data set comprising [$\sigma(m)$, $\omega$, m] is sent to the verifier. The verifier checks that the verification algorithm Vf accepts the signature $\sigma(m)$ for message m and public key $\omega$. If the verification algorithm Vf accepts the received data set, the digital signature is considered valid.

Further, in this embodiment, the individual is requested to provide his biometric template to the verifier 104. In case a fingerprint template is to be derived, the verifier 104 may comprise a fingerprint reader on which the individual places his index finger. The fingerprint reader extracts a second biometric template $\omega'$ of the individual, which may differ from the first biometric template $\omega$ received with the signature. Typically, the process of extracting a biometric template of an individual is inherently noisy, and due to the very nature of biometrics and measurement errors involved in obtaining templates, two templates will generally never be identical, albeit derived from the same biometric feature of a given individual. As has been described previously, the step of attaining the biometric template $\omega'$ may very well be performed before the step of receiving the biometric template $\omega$ along with the digital signature $\sigma(m)$ and the message m at the verifier. Hence, depending on the order in which theses steps are performed, the "first" template may denote the template attained by the verifier or the template received with the signature. Analogously, the "second" template may denote the template attained by the verifier or the template received with the signature.

When the second biometric template $\omega'$ has been derived at the verifier 104, it is compared to the first biometric template $\omega$ received with the digital signature. If the two biometric templates resemble each other to a sufficient extent according to an appropriate predetermined similarity measure (and the signature is verified), verification is considered to be successful. The method used in this particular embodiment prevents an attacker from succeeding in an attack where the data set comprising [$\sigma(m)$, $\omega$, m] sent from the smart card 102 to the verifier 104 is replaced with a different message, signature and public key by the attacker. If an attacker would replace the data set with his own data set, the attack would still not be successful since the individual 103 must provide the verifier 104 with his biometric template. Hence, the verification of a false signature with a corresponding false key provided by the attacker would not be considered valid.

In a further embodiment of the invention, the public key of the trusted authority, i.e. the master public key mpk is comprised in the data sent from the smart card 102 to the verifier 104. The master public key is typically the same for all individuals using the system.

With reference to FIG. 1 and the trusted authority 101 in particular, which typically acts as an enrolling authority, an individual's raw biometric data may be derived from e.g. fingerprints, iris or retinal, facial, ear or hand geometry, voice features etc. by a sensor (not shown). The acquired data is typically processed at a processing device such as a digital signal processor (DSP). This data is then stored, preferably in encrypted form. This is an initialization procedure undertaken in order to register the individual, which is performed once for each individual who wishes to access the system. This procedure is referred to as enrollment. In a practical situation, the enrolment authority may coincide with the verifier, but the authorities may also be distributed. As an example, if the biometric system is used for banking applications, all larger offices of the bank will be allowed to enroll new individuals into the system, such that a distributed enrolment authority is created. If, after enrolment, the individual wishes to withdraw money from such an office while using her biometric data as authentication, this office will assume the role of verifier. On the other hand, if the user makes a payment in a convenience store using her biometric data as authentication, the store will assume the role of the verifier, but it is unlikely that the store ever will act as enrolment authority.

As can be seen hereinabove, the individual has access to a device 102 that has computing capabilities (and possibly contains a biometric sensor). In practice, the device could comprise a fingerprint sensor integrated in a smart card or a camera for iris or facial recognition in a mobile phone or a PDA. The verifying device 104 also comprises means with computing capabilities, such as a microprocessor 106. further, the verifying device 104 comprises a biometric sensor 105, for extracting a biometric template from e.g. a fingerprint. Possibly, the biometric sensor is combined with a smart card reader 105 for receiving a biometric template and a signature from the smart card 102 of the individual 103.

Devices comprised in a biometric identification system as set forth herein are typically arranged with microprocessors or other similar electronic equipment having computing capabilities, for example programmable logic devices such as ASICs, FPGAs, CPLDs etc. Further, the microprocessors typically execute appropriate software stored in memories, on discs or on other suitable media for performing identification.

Also note that biometric enrolment data and verification data may be cryptographically concealed by means of employing one-way hash functions, or any other appropriate cryptographic function that conceals the enrolment data and verification in a manner such that it is computationally infeasible to create a plain text copy of the enrolment/verification data from the cryptographically concealed copy of the enrolment/verification data. It is for example possible to use a keyed one-way hash function, a trapdoor hash function, an asymmetric encryption function or even a symmetric encryption function.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of verifying the validity of a digital signature based on biometric data, the method comprising the acts of:
   attaining by a verifier a first biometric template of an individual to be verified using a biometric sensor;
   storing on a user device a secret user key and a signing algorithm to create the digital signature on a message, and a second biometric template of the individual to be verified, wherein the secret user key is created by a trusted authority device using a secret master key and the second biometric template, wherein the second biometric template is obtained by the trusted authority device from the individual during registration of the individual, and wherein the digital signature is created using the signing algorithm to sign the message with the secret user key;
   receiving by the verifier, from the user device, the digital signature, the message and the second biometric template of the individual associated with the digital signature;
   verifying by the verifier the digital signature by using one of the first biometric template and the second biometric template as a public key; and
   comparing by the verifier the first biometric template with the second biometric template, wherein the verifying act is considered to be valid if the first biometric template matches the second biometric template within a predetermined value, wherein the verifier is different from the trusted authority device.

2. The method according to claim 1, wherein the verifying act is performed by using the first biometric template as a public key.

3. The method according to claim 1, wherein the verifying act is performed by using the second biometric template as a public key.

4. The method according to claim 1, wherein the user device is a smart card.

5. A device for verifying the validity of a digital signature based on biometric data, the device comprising a processor configured to perform the acts of:
   attaining a first biometric template of an individual to be verified using a biometric sensor;
   storing on a smart card a secret user key and a signing algorithm to create the digital signature on a message, and a second biometric template of the individual to be verified, wherein the secret user key is created by a trusted authority device using a secret master key and the second biometric template, wherein the second biometric template is obtained by the trusted authority device from the individual during registration of the individual, and wherein the digital signature is created using the signing algorithm to sign the message with the secret user key;
   receiving by the verifier, from the smart card, the digital signature, the message and the second biometric template of the individual associated with the digital signature;
   verifying by the verifier the digital signature by using one of the first biometric template and the second biometric template as a public key; and
   comparing by the verifier the first biometric template with the second biometric template, wherein the verifying act is considered to be valid if the first biometric template matches to the second biometric template within a predetermined value, wherein the device including the processor is different from the trusted authority device.

6. The device according to claim 5, wherein the verifying act is performed by using the first biometric template as a public key.

7. The device according to claim 5, wherein the verifying act is performed by using the second biometric template as a public key.

8. A non-transitory computer readable medium embodying a computer program product comprising computer-executable components for causing the user device to perform the acts recited in claim 1 when the computer-executable components are run on a processing unit included in the user device.

9. The method of claim 1, wherein the first biometric template is related to a fingerprint of the individual, and wherein the attaining act reads the fingerprint of the individual using a reader of the verifier.

* * * * *